United States Patent
Burke

[15] 3,685,257
[45] Aug. 22, 1972

[54] CLEANING OF FILTERS USING VORTEX RINGS

[72] Inventor: Richard J. Burke, Corona Del Mar, Calif.

[73] Assignee: California Portland Cement Company, Los Angeles, Calif.

[22] Filed: May 13, 1970

[21] Appl. No.: 36,768

[52] U.S. Cl. .......................... 55/96, 55/292, 55/293
[51] Int. Cl. ............................................ B01d 46/04
[58] Field of Search ..................... 55/96, 293, 292

[56] References Cited

UNITED STATES PATENTS

| | | |
|---|---|---|
| 2,962,120 | 11/1960 | Lagarias ..................... 55/292 |
| 3,541,762 | 11/1970 | Ramaswami et al. .......... 55/96 |
| 3,543,481 | 12/1970 | Pausch .......................... 55/96 |
| 3,487,609 | 1/1970 | Caplan .......................... 55/96 |
| 3,410,056 | 11/1968 | Reinauer ....................... 55/96 |
| 3,095,289 | 6/1963 | Egan ........................... 55/96 U |

Primary Examiner—Howard R. Caine
Attorney—White, Haefliger and Bachand

[57] ABSTRACT

The invention concerns the cleaning of filter structure by generating gas flow in a traveling vortex ring, and directing ring travel into particulate cleaning relation with that structure.

21 Claims, 5 Drawing Figures

PATENTED AUG 22 1972 3,685,257
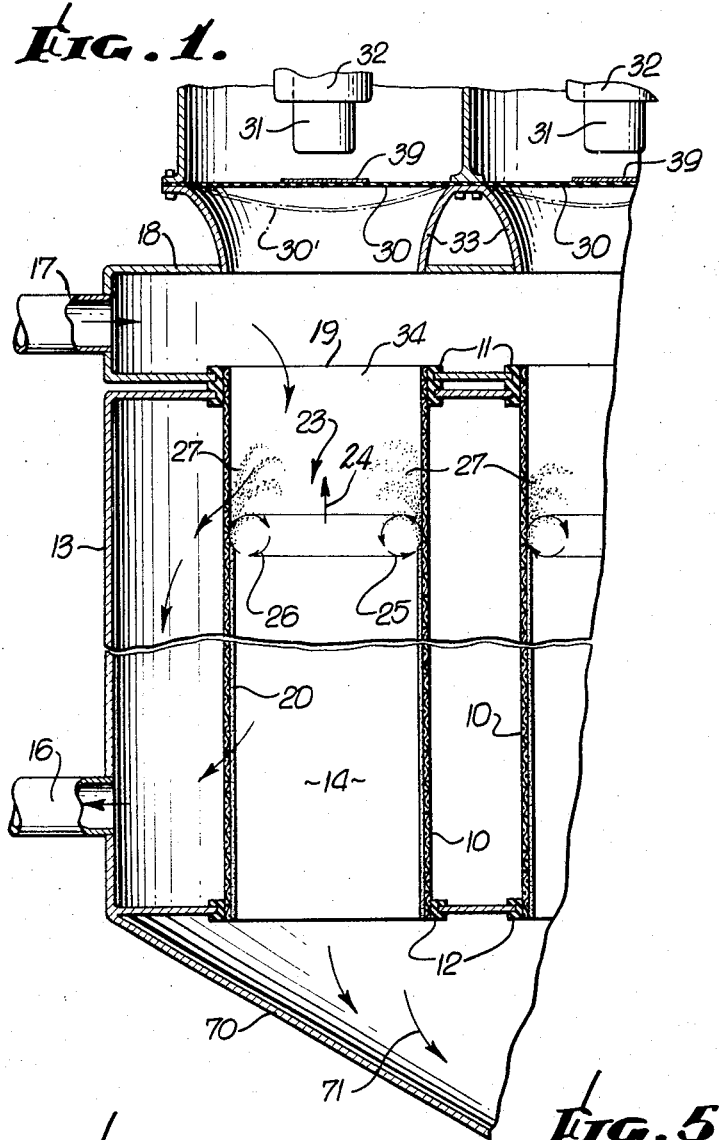
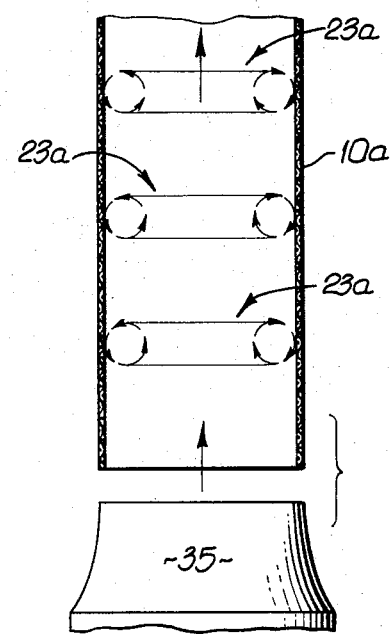
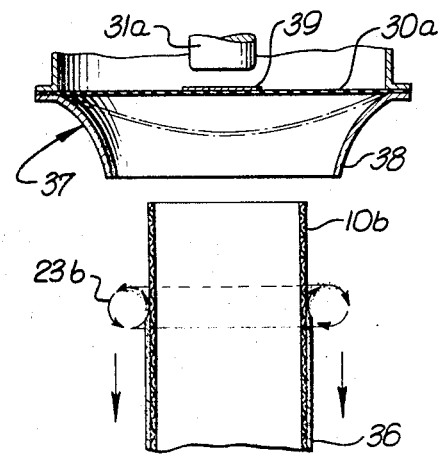
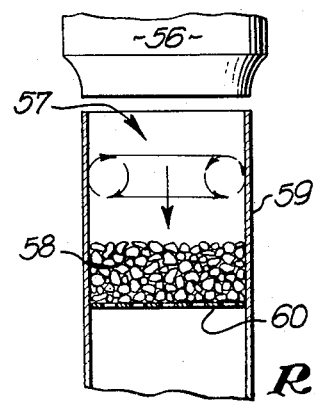
INVENTOR.
RICHARD J. BURKE
BY
White, Haefliger & Bachand
ATTORNEYS.

CLEANING OF FILTERS USING VORTEX RINGS

BACKGROUND OF THE INVENTION

This invention relates generally to the cleaning of filters and similar devices, and more particularly concerns the application of vortex rings to filters, such as bags, for cleaning purposes.

Dust laden gas, as for example air, is conventionally filtered by passage through collectors such as filter tubes or bags, the cleansed gas exiting from the mesh of the bag and the dust collecting in the mesh. One example of such practice if found in cement plants wherein dust in the gas discharged from cement kilns is thereby separated from the gas prior to passage of the gas to the stack. In order that the filtering operation may proceed efficiently, it is necessary to clean dust from the bag or bags at regular intervals. Known methods and means to achieve such cleaning have been found of disadvantage for a number of reasons. Among the latter are wear and wrinkling of the bags resulting from mechanical shaking thereof or high pressure gas discharge into the bags. Also, undesirable interruption of dust collecting is often necessary to facilitate such cleaning; further the power requirements for effective cleaning can be undesirably high.

SUMMARY OF THE INVENTION

It is a major object of the present invention to provide method and apparatus characterized as overcoming the above as well as other problems associated with the cleaning of particle collectors or filters. Basically, the method of the invention concerns cleaning of filter structure by generating gas flow in a traveling vortex ring, and directing ring travel into particulate loosening relation with that structure. Such rings differ from air blasts or puffs in that they are discrete and maintain their integrity (i.e. do not dissipate energy as do air blasts) as they travel through a fluid medium. Where the filter structure comprises a generally tubular bag, as for example is used to filter cement or other dust from kiln gas being passed to a stack, vortex ring travel is directed lengthwise of the bag and in close generally concentric proximity therewith, either inside or outside the bag. Typically, a series of such rings may be generated and directed to travel in sequence lengthwise of the bag; also, the generation of the rings may be effected at a sonic frequency rate whereby a large number of rings may be caused to travel simultaneously along the bag for rapid, efficient cleaning purposes. Further, sonic treatment of the bag may be carried out simultaneously with vortex ring travel along the bag, as will appear. Also, the method may also be used for cleaning filters in the form of granular beds. In this regard, vortex rings are to be distinguished from ordinary puffs or blasts of air.

As regards apparatus, the invention contemplates the provision of means for effecting air flow in a vortex ring traveling into particulate loosening relation with filter apparatus having porous structure to pass fluid and separate particulate therefrom. That structure may comprise a tubular bag or a granular bed as referred to above, and the ring may be produced by gas pulsing apparatus. Further, the ring may be discharged from ducting movable relative to the bag to discharge the ring at a selected locating of proximity to the bag. Also, multiple rings may be so generated to travel in particulate loosening relation to the filter, as referred to above. A further object is to provide method and means to promote mixing of particulate and fluid entraining same, proximate a filter zone, through usage of vortex rings, for more efficient filtering.

These and other objects and advantages of the invention, as well as the details of illustrative embodiments, will be more fully understood from the following description and drawings, in which:

DRAWING DESCRIPTION

FIG. 1 is an elevation taken in section to show vortex ring travel in a filter bag;

FIG. 2 is a view like FIG. 1, showing usage of multiple vortex rings;

FIG. 3 is a view like FIG. 1, but show vortex ring travel outside a filter bag;

FIG. 4 is an elevation taken in section showing selective location of vortex rings in a filter bag, and also ultrasonic cleaning thereof; and FIG. 5 is a view showing vortex ring cleaning of a granular filter bed.

DETAILED DESCRIPTION

In FIG. 1 a tube or bag 10 of suitable filtering material, as for example cloth, glass or synthetic fiber, is suspended from an upper ring 11, and extends downwardly to a lower ring 12. Multiple bags may be so provided. Housing structure 13 may surround the bag as well as a group of same, to receive cleansed gas passing from the bag interiors 14 to the chamber interior 15, that gas then typically flowing via exit duct 16 to a stack. Dust laden gas flows via supply duct 17 to a manifold 18 communicating with an open end of the bag, as for example the illustrated upper end 19, whereby dust entrained in the gas is adapted to collect in a layer 20 at the inside of the bag and in the interstices of the bag mesh. If the particulate is not periodically removed, the filtering efficiency becomes substantially reduced due to reduced gas flow rate through the bag mesh and increased pressure required to displace the gas through the bag.

In accordance with the invention, means is provided for effecting gas (as for example air) flow in a vortex ring traveling into particulate loosening relation with the filter structure, a typical ring being illustrated at 23 traveling upwardly in the direction of arrow 24. The existence and theory of such rings is well established, the rings representing a stable flow configuration which allows parcels of gas to be projected through the atmosphere. See for example the article "Buoyant Vortex Rings" by J. S. Turner, Proceedings of the Royal Society, London A 239, 61–75, (1957).

The ring 23 is shown as traveling lengthwise of the bag and in close generally concentric proximity therewith, as for example peripherally engaging the collected dust layer at 25 for loosening that particulate by means of the scrubbing action of the rapid circular flow of gas in the ring indicated at 26. Some loosened particulate is seen ejected at 27, that particulate for example consisting of cement or other dust separated from entrainment in effluent gas. Structure 13, 16, 17 and 18 represents means normally flowing effluent gas to the bag for passage through same between the interior and exterior thereof. Loosened particulate may fall or be urged downwardly in the tube by the vortex ring, or succession of same, to discharge into a collector 70, the rings sweeping the particulate downwardly therein, as in the direction of arrow 71. Of course, either upward or downward travel of the vortex rings is possible.

The means to produce the vortex ring 23, which may travel at several feet per second through the bag, may comprise suitable gas pulsing apparatus, One example of same is the diaphragm 30 adapted to be sharply downwardly struck by the hammer 31 actuated at 32, there being a vortex shaping annular shroud 33 converging as shown toward the entrance 34 at the upper end of the bag. Diaphragm 30 may for example consist of rubber or other suitable material such as metal, and adapted to flex downwardly and resiliently to the broken line position 30', when sharply struck. Other suitable means for producing vortex rings may be used. Such cleaning may be effected with or without accompanying shut-down of dust laden gas inlet flow at 17; and if such gas is flowing, the vortex rings help mix the particulate in the gas for more uniform filtering action along the bag length.

FIG. 2 illustrates a tubular filter bag 10a within which vortex rings 23a in close succession travel upwardly in the bag for cleaning purposes as in FIG. 1. Means for generating the rings is indicated generally at 35. If used principally to promote mixing, the rings may have reduced outer diameters.

FIG. 3 illustrates a vortex ring 23b traveling downwardly in close concentric proximity to the outer side of a filter bag 10b for scrubbing or cleaning collected particulate retained on the bag in a layer indicated at 36. That layer may be produced where dust laden gas is filtered by flow from the bag exterior to the interior. Means to produce such rings is indicated generally at 37 and includes a diaphragm 30a and striker 31a as in FIG. 1, and a vortex producing annular outer shroud 38 convergent upwardly as shown. A metal insert 39 centrally located on the diaphragm receives the impact of striker 31a, as in FIG. 1.

FIG. 4 illustrates the discharge of vortex rings 41 at a selected location along a tubular filter bag 42, as by means 43 movable lengthwise within the bag, for example. The assembly is mounted as on a lengthwise movable carrier 47. Also carried by the assembly is a transducer 49 for generating waves of sound or ultrasonic frequency traveling laterally in the gas within the tube for treating the bag, thereby to loosen particulate for more effective scrubbing by the vortex rings. The transducer may be annular, as shown, to extend close to the inner side of the bag, and may consist of a barium titanate ring 49 adapted to expand and contract radially with a frequency determined by the alternation of voltage application between plates 50 and 51 at the end faces of the ring 49. A voltage source is indicated at 52.

Finally, FIG. 5 shows the application, by means 56, of one or more vortex rings 57 to a filter in the form of a granular bed 58, for loosening particulate retained by the bed. Normally, the bed is operable to remove particulate from fluid flowing downwardly in the duct 59 within which the bed is retained as on a screen 60. The filter may be reverse flushed by upwardly flowing fluid to carry away particulate loosened by the action of the vortex rings dissipating their energy in the top portion of the bed.

I claim:

1. In combination with generally tubular filter apparatus having porous structure to pass fluid and separate particulate therefrom, means for effecting gas flow in a vortex ring traveling into particulate loosening relation with said structure.

2. In combination with filter apparatus having porous structure to pass fluid and separate particulate therefrom; means for effecting gas flow in a vortex ring traveling into particulate loosening relation with said structure, said porous structure comprising a generally tubular bag between the exterior and interior of which the particulate containing fluid is caused to pass.

3. The combination of claim 2 wherein said bag is elongated, and said means directs said rings to travel lengthwise of the bag and in close generally concentric proximity therewith.

4. The combination of claim 3 wherein said means directs said rings to travel lengthwise within the bag interior.

5. The combination of claim 3 wherein said means directs said rings to travel lengthwise at the bag exterior and in closely surrounding relation to the bag.

6. The combination of claim 3 wherein said fluid comprises cement kiln effluent gas entraining said particulate in the form of cement dust, and including means normally flowing said effluent gas to the bag for passage between the exterior and interior thereof.

7. The combination of claim 3 wherein said means includes gas pulsing apparatus.

8. The combination of claim 3 wherein said means includes ducting movable relative to the bag and having an outlet for discharging a traveling vortex ring at a selected location of proximity to the bag.

9. The combination of claim 1 wherein said porous structure comprises a granular bed for passing said fluid and separating said particulate.

10. The combination of claim 1 wherein said means includes means to produce a series of said rings traveling as defined.

11. The combination of claim 10 wherein said series of rings is produced at a sonic frequency rate.

12. The combination of claim 10 including means to produce a sonic disturbance traveling into said structure in conjunction with said ring travel.

13. The combination of claim 7 wherein said gas pulsing apparatus includes a striker and a diaphragm adapted to receive impact transmitted by the striker, and said means includes a vortex ring shaping shroud within which the diaphragm is adapted to be deflected in response to said impact reception.

14. The combination of claim 2 including ducting to flow particulate entraining gas to the upper interior of said bag and to flow cleansed gas from the outer side of the bag, said means being spaced above the upper end of the bag, and there being a collector for particulate discharged from the lower open end of the bag.

15. The method of loosening particulate collected at generally tubular filter structure, that includes
 a. generating gas flow in a traveling vortex ring, and
 b. directing said ring travel into particulate loosening relation with said structure.

16. The method of loosening particulate collected at filter structure comprising a generally tubular bag, that includes
 a. generating gas flow in a traveling vortex ring, and
 b. directing said ring travel into particulate loosening relation with said structure;

c. said directing step being carried out to effect ring travel lengthwise of the bag and in close generally concentric proximity thereto.

17. The method of claim 16 wherein said ring travel is effected outside the bag.

18. The method of claim 16 wherein said ring travel is effected within the bag.

19. The method of claim 16 wherein a series of said rings are generated and directed to travel lengthwise of the bag.

20. The method of claim 15 including the step of passing particulate laden fluid to said structure to separate particulate therefrom during said vortex ring travel.

21. The method of promoting filtering that includes:
a. passing fluid and particulate entrained therein to a generally tubular filter zone, and
b. passing a vortex ring in said fluid as the fluid approaches said zone.

* * * * *